United States Patent [19]

Vogl

[11] Patent Number: 4,538,632

[45] Date of Patent: Sep. 3, 1985

[54] SHUTOFF VALVE FOR FUEL TRUCK OR TANKER DRAIN OFF DOWNSPOUTS

[76] Inventor: Dennis A. Vogl, 6625 N. M-52, Henderson, Mich. 48841

[21] Appl. No.: 542,598

[22] Filed: Oct. 17, 1983

[51] Int. Cl.³ .............................................. F16K 13/04
[52] U.S. Cl. ..................................... 137/77; 137/351; 220/89 B; 220/88 R
[58] Field of Search .......................... 137/75, 77, 351; 220/86 R, 89 B, 88 R

[56] References Cited

U.S. PATENT DOCUMENTS

| | | | |
|---|---|---|---|
| 1,612,616 | 12/1926 | Creighton | 137/77 |
| 1,825,124 | 9/1931 | Pierret | 137/77 |
| 2,004,717 | 6/1935 | Thwaits | 137/77 |
| 2,956,574 | 10/1960 | Cowan | 137/77 |
| 3,165,236 | 1/1965 | Beazer | 137/77 UX |
| 3,310,070 | 3/1967 | Black | 137/77 X |
| 3,467,274 | 9/1969 | Schmitt | 220/86 R |

Primary Examiner—Harold W. Weakley
Attorney, Agent, or Firm—Malcolm R. McKinnon

[57] ABSTRACT

A shutoff valve for the downspouts of fuel trucks or tankers, the shutoff valve being installed at the inlet of a downspout and serving to seal off the inlet of the downspout until such time as overflow fuel or other liquids can be safely drained off from an overflow liquid well provided at the top of the tank. The valve includes manually actuatable means for opening the valve and also includes means for automatically closing the valve in the event of a fire.

5 Claims, 8 Drawing Figures

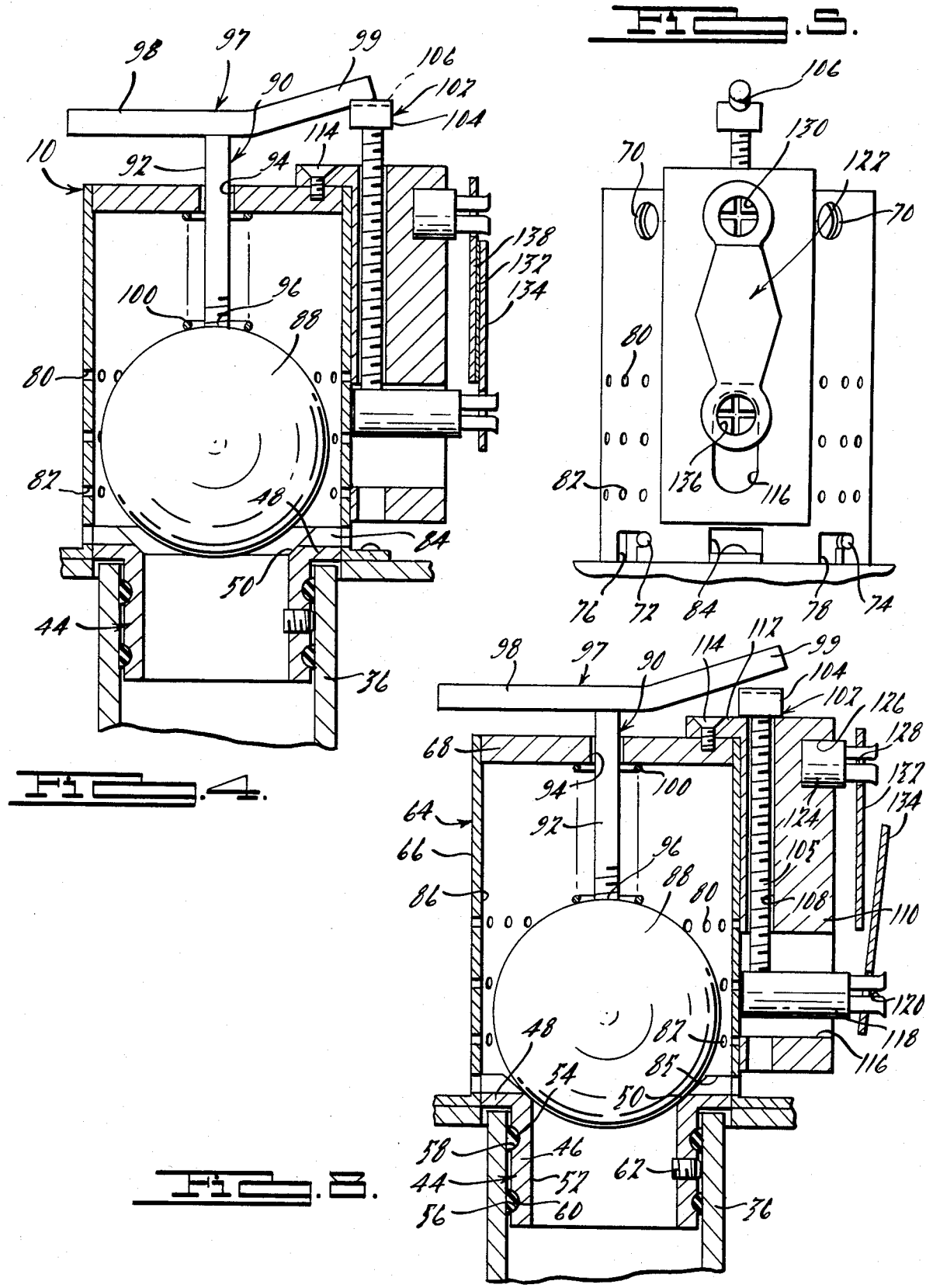

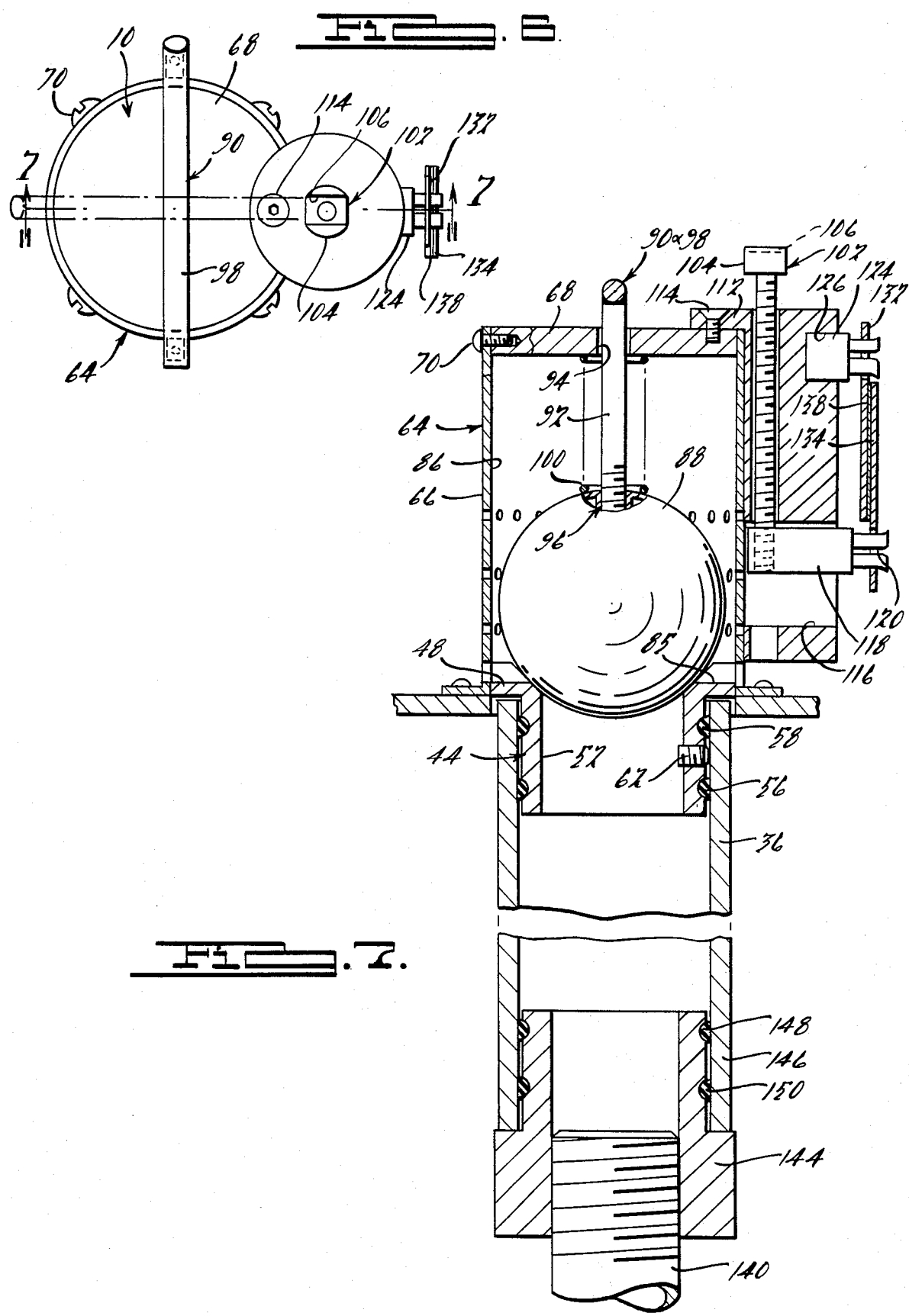

SHUTOFF VALVE FOR FUEL TRUCK OR TANKER DRAIN OFF DOWNSPOUTS

BRIEF SUMMARY OF THE INVENTION

This invention relates to valves and, more particularly, to a new concept of shutoff valve particularly adapted for use with fuel trucks or tankers engaged in the transportation and delivery of flammable or toxic liquids such as gasoline, kerosene, diesel fuel, chemicals and the like, although it will be understood that the present invention is applicable to other uses. Present day fuel trucks or tankers engaged in the transportation and delivery of flammable or toxic liquids are provided with loading ports at the top of the tank through which fuel and other flammable or chemical liquids are loaded into the tank. The liquid loading ports are located in a recess or well which is provided at the top of the tank, the recess or well being open at the top, and if any liquid overflows from the loading ports as the tank is being filled, the overflow liquid is confined in the recess provided at the top of the tank so that the liquid does not run down the outside of the tank in an uncontrolled manner. Present day fuel trucks or tankers are also provided with drain off downspouts or pipes, similar to scuppers conventionally provided for self-draining cockpits on sailboats. Such downspouts or scuppers are simply pipes open at each end and leading from the recess at the top of the tank downwardly (outside the tank) so that excess fuel or other liquid is drained from the recess directly onto the ground at a location adjacent the wheels of the vehicle. Present day fuel trucks or tankers are not equipped with means for shutting off the downspouts or scuppers during an overflow crisis, and heretofore some operators have used rubber or neoprene plugs to close the drain off downspouts although such operators often fail to leave the plugs in place. Other operators simply leave the drain off downspouts open at all times. In addition, the outlets of present day drain off downspouts on fuel trucks or tankers are often located near the exhaust systems of the truck and pose a potential fire hazard if any overflow of fuel occurs, which, for example, may come into contact with the hot exhaust system. In addition, since the excess fuel or other liquid drains directly out of the downspouts onto the ground, the soil is contaminated by the overflow fuel or liquid.

The primary objective of the present invention is to provide an improved shutoff valve for fuel truck or tanker overflow liquid drain off downspouts, which improved valve serves to seal off the inlet of the drain off downspouts until such time as overflow liquid can be safely drained from the recess provided at the top of the tank.

Another object of the present invention is to provide an improved shutoff valve for the downspouts of fuel trucks or tankers, which valve incorporates improved means for automatically closing the valve in the event of a fire.

Another object of the present invention is to provide an improved shutoff valve for fuel truck or tanker drain off downspouts that is economical to manufacture and assemble, durable, efficient and reliable in operation.

Another object of the present invention is to provide an improved shutoff valve for fuel truck or tanker drain off downspouts which may be easily and quickly manually moved between the open and closed positions with a minimum of time and labor.

Another object of the present invention is to provide an improved shutoff valve for fuel truck or tanker drain off downspouts incorporating improved means for maintaining the valve in selected open positions and which functions to automatically close the valve in the event of a fire.

Another object of the present invention is to provide an improved shutoff valve for fuel truck or tanker drain off downspouts which may be readily installed on a fuel truck or tanker with a minimum of time, labor and expense and without requiring modification of the downspouts.

The above as well as other objects and advantages of the present invention will become apparent from the following description, the appended claims and the accompanying drawings.

BRIEF DESCRIPTION OF THE DRAWINGS

FIG. 4 is an enlarged, sectional, elevational view of the valve illustrated in FIG. 1, showing the same in the open position;

FIG. 5 is a side elevational view of a portion of the structure illustrated in FIG. 4;

FIG. 6 is a top plan view of the valve illustrated in FIG. 4;

FIG. 7 is an enlarged, sectional, side elevational view of a portion of the structure illustrated in FIG. 6, taken on the line 7—7 thereof and with portions broken away for clarity of illustration, and showing the valve in the manually closed position; and FIG. 8 is a sectional elevational view similar to FIG. 4 and illustrating the valve in the automatically closed position.

DETAILED DESCRIPTION

Figure 1:
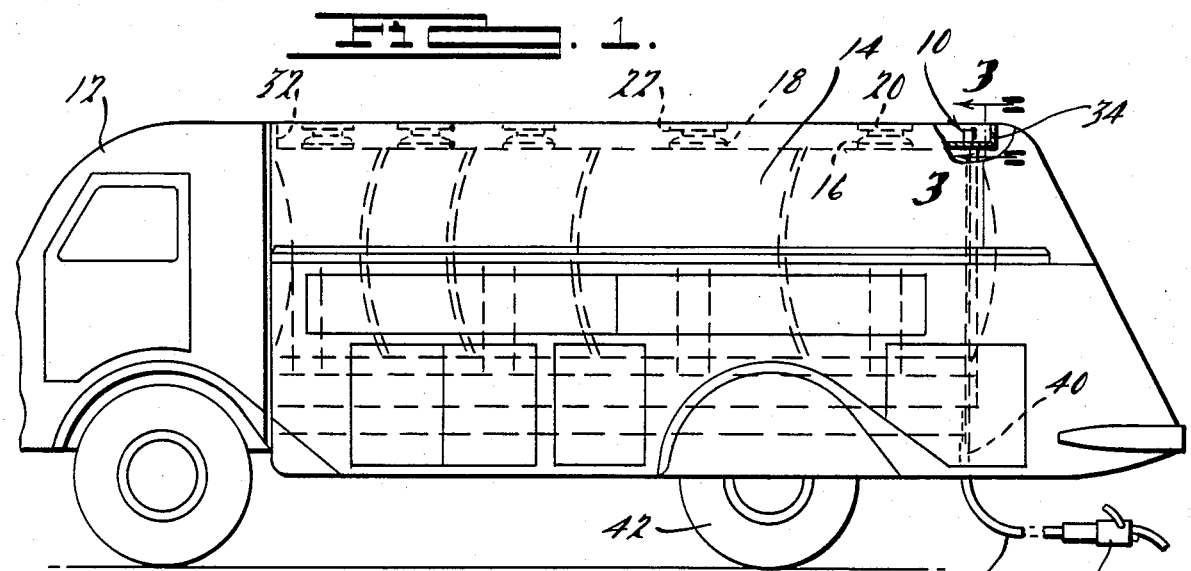
FIG. 1 is a side elevational view of a shutoff valve for fuel truck and tanker drain off downspouts embodying the present invention, showing the same installed on a fuel truck.
Figure 2:
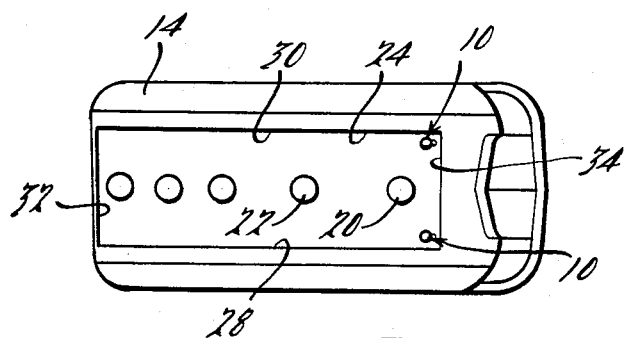
FIG. 2 is a top plan view, on a reduced scale, of a portion of the structure illustrated in FIG. 1.
Figure 3:
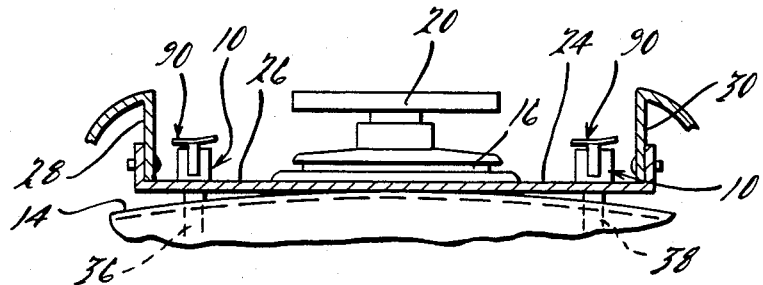
FIG. 3 is an enlarged cross-sectional view of a portion of the structure illustrated in FIG. 1, taken on the line 3—3 thereof.

In general, the present invention provides a shutoff valve for the downspouts of fuel trucks or tankers, which shutoff valve is installed at the inlet of the downspout and serves to seal off the inlet of the downspouts until such time as the overflow fuel can be safely drained off from the recess defined by the top of the tank by manually opening the valve. In addition, means is provided for automatically closing the valve after it has been manually opened if a fire occurs which would prevent the operator from manually closing the valve before all excess fuel had been drained from the recess provided at the top of the tank. Shutoff valves embodying the present invention may be removed for cleaning, inspection, repair or other purposes.

Referring to the drawings, a preferred embodiment of the invention is illustrated therein and is comprised of a shutoff valve, generally designated 10, which is particularly adapted for use on the drain off downspouts of fuel trucks or tankers engaged in the transportation and delivery of flammable liquids, such as gasoline, kerosene, diesel fuel and the like, although it will be understood that the present invention is also applicable for use with toxic liquid chemicals as well as other uses. The valve 10 is illustrated as installed on a fuel truck 12 having a compartmented fuel tank 14 provided with loading ports, such as 16 and 18, normally closed by covers, such as 20 and 22, respectively. Fuel is loaded into the tank 14 through the loading ports such as 16 and 18 after the covers have been manually opened in a conventional manner. The fuel ports are located in a large recess or well 24 conventionally provided on present day fuel trucks and tankers, the recess or well being defined, for example, by a bottom wall 26, side walls 28 and 30 and end walls 32 and 34 carried by the tank 14. The recess 24 is open at the top, and if any fuel overflows from the loading ports as the tank 14 is being filled, the overflow fluid is confined in the recess 24 by the side, end and bottom walls defining the recess 24 so that the overflow fuel does not run down outside of the tank 14 in an uncontrolled manner. Conventional drain off downspouts, such as 36 and 38, are provided, such downspouts being in the form of pipes leading from the recess 24, located at the top of the tank, downwardly (outside the tank) so that overflow fuel may be drained from the recess to the outlets of the pipes 36 and 38 located below the tank, as at 40, near the rear wheels 42 of the truck 12.

The valve 10 embodying the present invention is comprised of a base 44 which includes a cylindrical tubular portion 46 and an integral flange portion 48 which projects radially outwardly from the tubular portion 46. The base 44 is provided with a valve seat 50 at the inner junction of the tubular portion 46 with the flange portion 48, and the tubular portion 46 defines an outlet passageway 52 communicating with the valve seat 50. The tubular portion 46 is adapted to fit in the upper end portion of the downspouts, such as the downspout 36 or the downspout 38, in telescopic relationship therewith, and O-rings 54 and 56 are provided which are fitted in grooves 58 and 60, respectively, defined by the tubular portion 46 for the purpose of sealing the connection of the tubular portion with the downspout. If desired, a set screw 62 may be provided which projects through and threadably engages the wall of the tubular portion 46, the set screw 62 bearing against the inner wall of the downspout to releasably lock the base 44 to the downspout to discourage or prevent theft of the valve 10.

A housing 64 is provided having a cylindrical peripheral wall 66 and a top wall 68 secured to the peripheral wall by any suitable means such as the screws 70. The lower end portion of the peripheral wall 66 is secured to the flange portion 48 of the base 46 through the agency of set screws, such as 72 and 74 adapted to pass through inverted L-shaped slots such as 76 and 78 which are open at the lower edge of the housing whereby the housing may be readily removed from the base, as for cleaning, inspection, repair or other purposes, by rotating the housing relative to the base so as to align the set screws with the open ends of the inverted L-shaped slots, and thereafter lifting the housing from the base. The peripheral wall 66 of the housing 64 also defines a plurality of openings such as 80, 82 and 84, communicating with the chamber 86 defined by the housing 84 whereby overflow fuel or other liquids present in the recess 24 may flow into the chamber 86 and ultimately out through the passageway 52 defined by the base and through the associated downspout. The openings, such as 80 and 82, communicate directly with the chamber 86 through the peripheral wall 66 of the housing while the openings 84 communicate with the chamber 86 through slots, such as 85, provided in the upper surface of the flange portion 48 of the base 44.

A hollow ball valve 88 is provided which is adapted to seat against the valve seat 50 to close the passageway 52 defined by the base 44. A generally T-shaped handle 90 is provided having a shank portion 92 which extends through a centrally disposed opening 94 defined by the top wall 68 of the housing, the free end of the shank portion 92 of the handle being fixed to the ball valve 88 by any suitable means, as by a threaded connection 96 provided between the shank portion 92 of the handle and the ball valve 88. The handle 90 also includes a transversely extending, manual gripping portion 97 which is fixed to the shank portion 92 outside the top wall 68 of the housing whereby the portion 97 may be manually gripped for the purpose of lifting the ball valve 88 away from the valve seat 50. The gripping portion includes a segment 98 which is substantially perpendicular to the shank portion 92 and a segment 99 which extends at an angle, as for example approximately twenty degrees, with respect to the segment 98. The segments 98 and 99 can be alternately engaged with an adjustable stop member 100, described hereinafter in greater detail, to hold the ball valve 88 at varying distances away from the valve seat 50. A coil spring 100 is provided which is circumposed on the shank portion 92 of the handle, one end portion of the spring 100 bearing against the inner surface of the top wall 68 of the housing while the opposite end of the spring 100 bears against the ball valve 88 whereby the ball valve 88 is biased toward the valve seat 50.

An adjustable stop member 102 is provided for the handle 90, the stop member having a head portion 104 provided with a groove 106 adapted to receive either the segment 98 or the segment 99 of the gripping portion 97 of the handle and hold the handle and the ball valve 88 away from the valve seat 50 when either of the segments 98 or 99 of the handle are angularly aligned with and disposed in the groove 106 provided in the head portion 104 of the stop member. Because of the angular relationship of the segments 98 and 99, when the segment 98 is disposed in the groove 106, the valve 88 is held further away from the valve seat 50 than when the segment 99 is disposed in the groove 106. The stop member also includes a threaded shank portion 105 which projects through a longitudinally extending passageway 108 defined by a mounting block 110 having a flange portion 112 projecting radially outwardly from one end thereof and adapted to be secured to the top wall 68 of the housing 64 through the agency of a screw 114 whereby the mounting block is securely mounted on the housing 64. The mounting block 110 also defines a radially extending passageway 116 which communicates with the longitudinally extending passage 108. The inner end portion of the shank 105 of the stop member 102 threadably engages one end portion of a pin 118 which is disposed in the slot 116 and which projects outwardly therefrom, the outer end portion of the pin 118 being split, as at 120, to facilitate mounting a fusible link, generally designated 122, thereon, as will be described hereinafter in greater detail. A mounting pin 124 is also provided which projects into a recess 126 provided in the block 110, the pin 124 having a press fit in the recess whereby the pin 124 is securely fixed to the block 110. The outer end of the pin 124 is also split, as at 128, to facilitate fitting the pin 124 through an opening 130 provided in the upper end of the fusible link 122.

As shown in FIGS. 4 through 8, the fusible link 122 is of laminated construction and includes an inner plate 132 which defines the opening 130 adapted to receive the outer end portion of the pin 124. The fusible link 122 also includes an outer plate 134 defining an opening 136 adapted to receive the split outer end portion of the pin 118. The inner plate 132 and the outer plate 134 are fixed together by a layer 138 of suitable fusible material, such as solder, having a low melting point of any desired suitable temperature whereby in the event of a fire, the layer 138 will melt thereby releasing the plates 132 and 134 from each other. When the plates are released from each other, the spring 100 acting on the ball valve 88 forces the handle 90 downwardly thereby forcing the stop member 102 downwardly and enabling the ball valve 88 to seat against the valve seat 50.

In the installation, operation and use of the valve 10, the base 44 is connected to a downspout, such as a downspout 36 or 38, in the manner previously described after which the housing 64 is installed on the base 44 also in the manner previously described, and the handle 90 is angularly moved so that the segments 98 or 99 of the gripping portion 97 do not engage the head portion 104 of the stop member 102. Consequently the ball valve 88 is biased against the valve seat 50 to close the associated downspout. In the event any fuel or other liquid overflows into the well 24 during loading of the tank 14, such overflow fuel or liquid is retained in the well 24 by the closed valve 88. When it is desired to drain the well 24 of overflow fuel or liquid, the handle 90 is manually lifted and angularly moved so that one end of either the segment 98 or the segment 99 rests in the groove 106 defined by the head portion 104 of the stop member 102 thereby holding the ball valve 88 off of the valve seat 50 so that fuel or other liquid may flow through the valve 10 and down the downspouts, the distance that the valve 88 is held off the valve seat 50 depending upon whether the segment 98 or the segment 99 rests in the groove 106. As illustrated in FIGS. 1 and 7, if desired, a hose 140 having a conventional manually actuatable nozzle 142 at one end thereof and a coupling 144 at the other end thereof may be attached to the lower end portion 146 of the downspouts, as illustrated in FIG. 7, whereby the overflow fuel or other liquid draining through the downspout may be directed through the hose 140 into a suitable container, such as a 55 gallon drum, to conserve such overflow fuel or liquid and at the same time prevent contamination of the soil. The coupling 144 is illustrated as being provided with O-rings, such as 148 and 150, which serve to seal the connection between the coupling 144 and the downspout. Such a construction enables the hose 140 to be connected to the downspouts without requiring modification of the downspouts conventionally provided on present day fuel trucks or tankers.

In the event a fire occurs which would prevent the operator from manually closing the valve 10 before all excess fuel or other liquid has been drained from the well 24, the layer 138 of fusible material of the fusible link 122 will melt thereby disconnecting the plates 132 and 134 from each other. When the plates 132 and 134 are disconnected from each other, the spring 100 acting on the ball valve 88 will force the handle downwardly thereby forcing the stop member 102 downwardly and enabling the ball valve 88 to seat against the valve seat 50 to close the downspouts.

While a preferred embodiment of the invention has been illustrated and described, it will be understood that various changes and modifications may be made without departing from the spirit of the invention.

What is claimed is:

1. In a shutoff valve for fuel truck and tanker drain off downspouts, the combination including a base having a cylindrical tubular portion and an integral flange portion projecting radially outwardly from said tubular portion, said base including a valve seat located at the inner junction of said tubular portion with said flange portion, said tubular portion defining an outlet passageway communicating with said valve seat, means for connecting said tubular portion of said base to a downspout, a housing fixed to said base, said housing including a cylindrical peripheral wall and a top wall defining a chamber, said peripheral wall of said housing including a plurality of inlet openings communicating with said chamber, a ball valve disposed in said chamber and adapted to seat against said valve seat, means including a coil spring biasing said valve towards said valve seat, means including handle means for manually opening said valve, an adjustable stop member carried by said housing and engageable by said handle means whereby said valve is held away from said valve seat, and fusible means effective to disable said stop means in the event of a fire and permit said ball valve to engage said valve seat.

2. The combination as set forth in claim 1 including means for sealing the connection between said tubular portion of said base and the downspout.

3. The combination as set forth in claim 1, said handle means including angularly disposed segments selectively engageable with said stop means.

4. The combination as set forth in claim 3, said fusible means for disabling said stop member including a fusible link having one end portion thereof connected to said stop member and the other end portion thereof supported by said housing.

5. The combination as set forth in claim 4, said coil spring having one end portion thereof engaging said top wall of said housing and the other end portion thereof engaging said ball valve.

* * * * *